United States Patent
Sugiyama et al.

(10) Patent No.: US 12,135,534 B2
(45) Date of Patent: Nov. 5, 2024

(54) FUEL SUPPLY CONTROL APPARATUS

(71) Applicant: TOYOTA JIDOSHA KABUSHIKI KAISHA, Toyota (JP)

(72) Inventors: Koseki Sugiyama, Sunto-gun (JP); Daiki Yokoyama, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 381 days.

(21) Appl. No.: 17/845,134

(22) Filed: Jun. 21, 2022

(65) Prior Publication Data
US 2023/0004133 A1    Jan. 5, 2023

(30) Foreign Application Priority Data
Jun. 30, 2021    (JP) .................................. 2021-108354

(51) Int. Cl.
G05B 19/042    (2006.01)
G06Q 50/06     (2012.01)

(52) U.S. Cl.
CPC .......... *G05B 19/042* (2013.01); *G06Q 50/06* (2013.01); *G05B 2219/2639* (2013.01); *G05B 2219/45076* (2013.01)

(58) Field of Classification Search
CPC .......... G05B 19/042; G05B 2219/2639; G05B 2219/45076; G06Q 10/06; G06Q 10/063; G06Q 30/06; G06Q 30/0623; G06Q 50/04; G06Q 50/06; F23N 5/26
See application file for complete search history.

(56) References Cited

U.S. PATENT DOCUMENTS

| 7,951,497 B2 * | 5/2011 | Tanaka ............. H01M 8/04302 |
| | | 429/429 |
| 2021/0001266 A1 | 1/2021 | Sugiyama et al. |

FOREIGN PATENT DOCUMENTS

| CA | 2839656 A1 * | 12/2012 | ....... H01M 8/04228 |
| CN | 215927488 U * | 3/2022 | |
| GB | 2585286 A | 1/2021 | |
| JP | 2766185 B2 * | 6/1998 | |
| JP | H11283655 A * | 10/1999 | |
| JP | 2004218856 A * | 8/2004 | |
| JP | 3899518 B2 * | 3/2007 | ............ G06F 1/263 |
| JP | 4929672 B2 * | 5/2012 | |
| JP | 2012-244982 A | 12/2012 | |
| JP | 2015-109767 A | 6/2015 | |

(Continued)

*Primary Examiner* — Crystal J Barnes-Bullock
(74) *Attorney, Agent, or Firm* — Oblon, McClelland, Maier & Neustadt, L.L.P.

(57) ABSTRACT

A fuel supply control apparatus configured to supply carbon dioxide-origin fuel to a power generation facility configured to generate electric power by at least using the carbon dioxide-origin fuel and a common fuel different from the carbon dioxide-origin fuel. The fuel supply control apparatus includes an electronic control unit. The electronic control unit is configured to set a supply time and supply amount of the carbon dioxide-origin fuel to be supplied to the power generation facility. The electronic control unit is configured to acquire fuel information on a use fuel including the common fuel and the carbon dioxide-origin fuel to be used in the power generation facility. The electronic control unit is configured to variably adjust and set each of the supply time and the supply amount based on the fuel information.

6 Claims, 2 Drawing Sheets

(56) References Cited

FOREIGN PATENT DOCUMENTS

| JP | 6232985 B2 | * | 11/2017 | | |
|----|------------|---|---------|---|---|
| JP | 2019-149105 A | | 9/2019 | | |
| JP | 2021-008852 A | | 1/2021 | | |
| JP | 6916754 B2 | * | 8/2021 | ............... | F23N 5/00 |

* cited by examiner

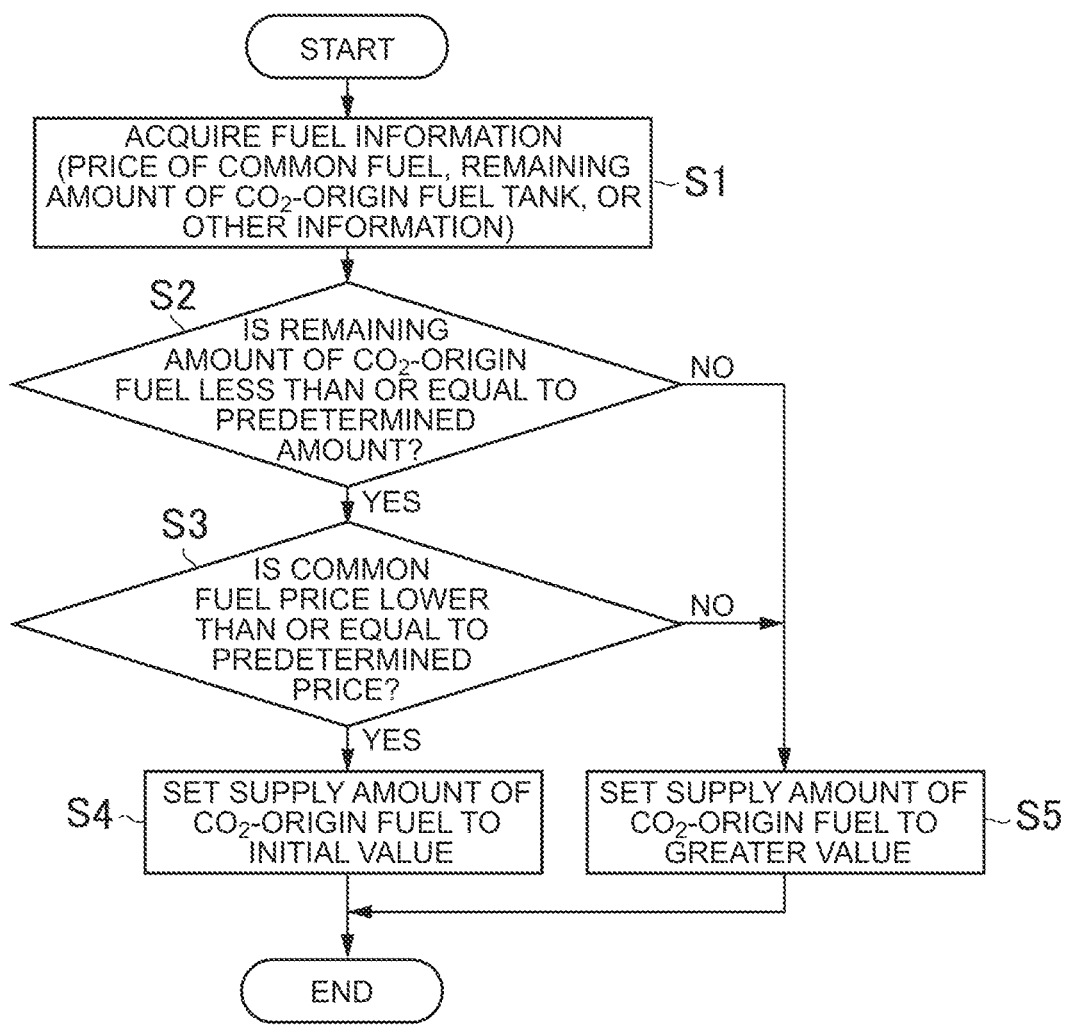

FUEL SUPPLY CONTROL APPARATUS

CROSS-REFERENCE TO RELATED APPLICATION

This application claims priority to Japanese Patent Application No. 2021-108354 filed on Jun. 30, 2021, incorporated herein by reference in its entirety.

BACKGROUND

1. Technical Field

The present disclosure relates to a fuel supply control apparatus.

2. Description of Related Art

Japanese Unexamined Patent Application Publication No. 2012-244982 (JP 2012-244982 A) describes a carbon dioxide effective utilization system intended to effectively use carbon dioxide emitted to the atmosphere. The carbon dioxide effective utilization system described in JP 2012-244982 A includes a fuel production unit that produces fuel from carbon dioxide in exhaust gas by using the photosynthesis of algae. In the fuel production unit, carbon dioxide is taken into algae out of exhaust gas supplied, and hydrocarbon compounds are synthesized in cells of algae by the photosynthesis of the algae. Therefore, fuel made up of hydrocarbon compounds is produced by squeezing out the oil content of the synthesized hydrocarbon compounds from algae in the fuel production unit. In other words, fuel made from carbon dioxide (carbon dioxide-origin fuel) is produced from carbon dioxide in exhaust gas. The carbon dioxide effective utilization system described in JP 2012-244982 A is configured to supply carbon dioxide-origin fuel extracted from algae in the fuel production unit to a fuel usage device, such as a thermal power plant and another power generation facility, and supply exhaust gas emitted from the fuel usage device as a result of burning of carbon dioxide-origin fuel to the fuel production unit again.

SUMMARY

In the carbon dioxide effective utilization system described in JP 2012-244982 A, carbon dioxide in exhaust gas is recycled in the fuel production unit and is supplied, as carbon dioxide-origin fuel, to the fuel usage device, such as a thermal power plant. At the same time, exhaust gas emitted from the fuel usage device is supplied to the fuel production unit. In other words, carbon dioxide in exhaust gas circulates between the fuel usage device and the fuel production unit. Therefore, with the carbon dioxide effective utilization system described in JP 2012-244982 A, the amount of emission of carbon dioxide is reduced, and emitted carbon dioxide is reused as fuel, so the cost of fuel is reduced.

However, when carbon dioxide recovered from exhaust gas is reformed to carbon dioxide-origin fuel to be recycled as in the case of the carbon dioxide effective utilization system described in JP 2012-244982 A, the effect obtained by using carbon dioxide-origin fuel, that is, the fuel cost reduction effect (cost performance), varies depending on when the carbon dioxide-origin fuel is supplied and how much the carbon dioxide-origin fuel is supplied. The above-described carbon dioxide-origin fuel tends to be higher in cost than existing common fuels (for example, fossil fuels, such as petroleum, coal, and natural gas). Therefore, when (at a time or during a period when) the prices of the above-described common fuels are high, cost performance resulting from the usage of carbon dioxide-origin fuel increases. However, if carbon dioxide-origin fuel is used when (at a time or during a period when) the prices of common fuels are low, cost performance resulting from the usage of carbon dioxide-origin fuel decreases. If a storage tank or a storage facility that stores carbon dioxide-origin fuel produced is full, an opportunity to recycle carbon dioxide is missed. For these inconveniences, the carbon dioxide effective utilization system described in JP 2012-244982 A has not specifically taken into consideration to change or adjust a supply time and supply amount of carbon dioxide-origin fuel. Therefore, it may not be possible to supply carbon dioxide-origin fuel in appropriate amount at appropriate time to achieve high cost performance.

The present disclosure provides a fuel supply control apparatus capable of supplying carbon dioxide-origin fuel recycled from carbon dioxide in exhaust gas or the atmosphere in appropriate amount at appropriate time.

An aspect of the present disclosure provides a fuel supply control apparatus configured to supply carbon dioxide-origin fuel to a power generation facility configured to generate electric power by at least using the carbon dioxide-origin fuel and a common fuel different from the carbon dioxide-origin fuel. The carbon dioxide-origin fuel is recycled as a fuel from carbon dioxide that is emitted when energy is consumed and is stored in a fuel storage facility. The fuel supply control apparatus includes an electronic control unit. The electronic control unit is configured to set a supply time and supply amount of the carbon dioxide-origin fuel to be supplied to the power generation facility. The electronic control unit is configured to acquire fuel information on a use fuel including the common fuel and the carbon dioxide-origin fuel to be used in the power generation facility. The electronic control unit is configured to variably adjust and set each of the supply time and the supply amount based on the fuel information.

In the aspect of the present disclosure, the electronic control unit may be configured to acquire a current price (or information on a current price) of the common fuel as the fuel information and variably adjust each of the supply time and the supply amount based on the current price.

In the aspect of the present disclosure, the electronic control unit may be configured to, when the current price is higher than a predetermined price (or at a time when the current price is higher than a predetermined price), increase the supply amount as compared to when the current price is lower than or equal to the predetermined price (or at a time when the current price is lower than or equal to the predetermined price), to increase a ratio of the carbon dioxide-origin fuel to the use fuel. Alternatively, the electronic control unit may be configured to increase the supply amount as the current price increases, to increase a ratio of the carbon dioxide-origin fuel to the use fuel.

In the aspect of the present disclosure, the electronic control unit may be configured to acquire a stored amount (remaining amount) of the carbon dioxide-origin fuel in the fuel storage facility as the fuel information and variably adjust each of the supply time and the supply amount based on the stored amount.

In the aspect of the present disclosure, the electronic control unit may be configured to, when the stored amount is greater than a first predetermined amount (or at a time when the stored amount is greater than a first predetermined amount), increase the supply amount as compared to when the stored amount is less than or equal to the first predetermined amount (or at a time when the stored amount is less than or equal to the first predetermined amount), to increase a ratio of the carbon dioxide-origin fuel to the use fuel. Alternatively, the electronic control unit may be configured to increase the supply amount as the stored amount increases, to increase a ratio of the carbon dioxide-origin fuel to the use fuel.

In the aspect of the present disclosure, the electronic control unit may be configured to acquire a production time of the carbon dioxide-origin fuel and a production amount of the carbon dioxide-origin fuel as the fuel information, predict a future stored amount that is the stored amount in a future (after a predetermined period) based on the stored amount, the production time, and the production amount, acquired as the fuel information, and, when the future stored amount is greater than a second predetermined amount (or at a time when the future stored amount is greater than a second predetermined amount), increase the supply amount as compared to when the future stored amount is less than or equal to the second predetermined amount (or at a time when the future stored amount is less than or equal to the second predetermined amount), to increase a ratio of the carbon dioxide-origin fuel to the use fuel. Alternatively, the electronic control unit may be configured to increase the supply amount as the future stored amount increases, to increase a ratio of the carbon dioxide-origin fuel to the use fuel.

The fuel supply control apparatus according to the aspect of the present disclosure supplies carbon dioxide-origin fuel that is produced by recycling carbon dioxide in exhaust gas or in the atmosphere to, for example, a power generation facility, such as a power generating plant and a power generation apparatus. The intended power generation facility in the aspect of the present disclosure generates electric power by using the carbon dioxide-origin fuel recycled as described above and a common fuel, such as petroleum, coal, and natural gas, different from the carbon dioxide-origin fuel. The carbon dioxide-origin fuel is produced by recycling and is then stored in a predetermined fuel storage facility. The fuel supply control apparatus according to the aspect of the present disclosure supplies the carbon dioxide-origin fuel stored in the fuel storage facility to the power generation facility in a predetermined supply amount at a predetermined supply time. At this time, the fuel supply control apparatus according to the aspect of the present disclosure variably adjusts and sets each of the supply time and supply amount of the carbon dioxide-origin fuel based on fuel information on a use fuel (the common fuel and the carbon dioxide-origin fuel) in the power generation facility.

For example, data related to the current price of a common fuel, a crude oil price, or the like is acquired as the fuel information. Alternatively, data related to the stored amount of the carbon dioxide-origin fuel, the production time and production amount of the carbon dioxide-origin fuel, and the like is acquired as the fuel information. Therefore, with the fuel supply control apparatus according to the aspect of the present disclosure, the supply time and supply amount of the carbon dioxide-origin fuel are able to be variably and flexibly set in consideration of the price of the common fuel and the stored amount (remaining amount) of the carbon dioxide-origin fuel. Therefore, the carbon dioxide-origin fuel recycled from exhaust gas or the atmosphere is able to be supplied to the power generation facility in appropriate supply amount at appropriate supply time.

The fuel supply control apparatus according to the aspect of the present disclosure acquires the current price of the common fuel as the fuel information and, when the current price of the common fuel is higher than a predetermined price, increases the supply amount of the carbon dioxide-origin fuel as compared to when the current price of the common fuel is lower than or equal to the predetermined price. In other words, at a time when the current price of the common fuel is higher than a predetermined price, the supply amount of the carbon dioxide-origin fuel is increased as compared to when the current price of the common fuel is lower than or equal to the predetermined price. For example, as the current price of the common fuel increases, the supply amount of the carbon dioxide-origin fuel is increased. Therefore, with the fuel supply control apparatus according to the aspect of the present disclosure, at a time when the current price of the common fuel is high due to, for example, rising crude oil prices or the like, the ratio of the carbon dioxide-origin fuel used in the power generation facility is able to be increased by increasing the supply amount of the carbon dioxide-origin fuel. Therefore, it is possible to increase cost performance resulting from using the carbon dioxide-origin fuel in the power generation facility.

The fuel supply control apparatus according to the aspect of the present disclosure acquires the stored amount (remaining amount) of the carbon dioxide-origin fuel as the fuel information and, when the stored amount of the carbon dioxide-origin fuel is greater than a predetermined amount, increases the supply amount of the carbon dioxide-origin fuel as compared to when the stored amount of the carbon dioxide-origin fuel is less than or equal to the predetermined amount. In other words, at a time when the stored amount of the carbon dioxide-origin fuel is greater than a predetermined amount, the supply amount of the carbon dioxide-origin fuel is increased as compared to at a time when the stored amount of the carbon dioxide-origin fuel is less than or equal to the predetermined amount. For example, as the stored amount of the carbon dioxide-origin fuel increases, the supply amount of the carbon dioxide-origin fuel is increased. Therefore, with the fuel supply control apparatus according to the aspect of the present disclosure, when, for example, the stored amount of the carbon dioxide-origin fuel is greater than a predetermined amount and the fuel storage facility of the carbon dioxide-origin fuel is likely to be full, it is possible to reduce the stored amount of the carbon dioxide-origin fuel stored in the fuel storage facility by increasing the supply amount of the carbon dioxide-origin fuel. In other words, it is possible to provide room in the storable capacity of the fuel storage facility in anticipation that the fuel storage facility becomes full of the carbon dioxide-origin fuel. As a result, it is possible to avoid missing of an opportunity to produce the carbon dioxide-origin fuel due to the fact that the fuel storage facility becomes full of the carbon dioxide-origin fuel, so the carbon dioxide-origin fuel is able to be continuously produced by recycling carbon dioxide. Therefore, the carbon dioxide-origin fuel is able to be produced by efficiently recycling carbon dioxide in exhaust gas or in the atmosphere.

The fuel supply control apparatus according to the aspect of the present disclosure acquires data related to the production time, the production amount, and the like of the carbon dioxide-origin fuel by recycling carbon dioxide. The future stored amount of the carbon dioxide-origin fuel, for example, the stored amount of the carbon dioxide-origin fuel after a lapse of a predetermined period, is predicted based on the stored amount (remaining amount) of the carbon dioxide-origin fuel and the production time and production amount of the carbon dioxide-origin fuel as described above, acquired as fuel information. When the predicted stored amount of the carbon dioxide-origin fuel is greater than a predetermined amount, the supply amount of the carbon dioxide-origin fuel is increased as compared to when the predicted stored amount of the carbon dioxide-origin fuel is less than or equal to the predetermined amount. In other words, at a time when the predicted stored amount of the carbon dioxide-origin fuel is greater than a predetermined amount, the supply amount of the carbon dioxide-origin fuel is increased as compared to at a time when the predicted stored amount of the carbon dioxide-origin fuel is less than or equal to the predetermined amount. For example, as the predicted stored amount of the carbon dioxide-origin fuel increases, the supply amount of the carbon dioxide-origin fuel is increased. Therefore, with the fuel supply control apparatus according to the aspect of the present disclosure, when, for example, the stored amount of the carbon dioxide-origin fuel is greater than a predetermined amount and the fuel storage facility of the carbon dioxide-origin fuel is predicted to be full, the stored amount of the carbon dioxide-origin fuel stored in the fuel storage facility is able to be reduced in advance by increasing the supply amount of the carbon dioxide-origin fuel. In other words, it is possible to provide room in advance in the storable capacity of the fuel storage facility in anticipation that the fuel storage facility becomes full of the carbon dioxide-origin fuel. As a result, it is possible to further reliably avoid missing of an opportunity to produce the carbon dioxide-origin fuel due to the fact that the fuel storage facility becomes full of the carbon dioxide-origin fuel, so the carbon dioxide-origin fuel is able to be continuously produced by recycling carbon dioxide. Therefore, the carbon dioxide-origin fuel is able to be produced by appropriately, efficiently recycling carbon dioxide in exhaust gas or in the atmosphere.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 2 is a flowchart for illustrating an example of control that is executed by the fuel supply control apparatus according to the embodiment of the present disclosure.

DETAILED DESCRIPTION OF EMBODIMENTS

Figure 1:
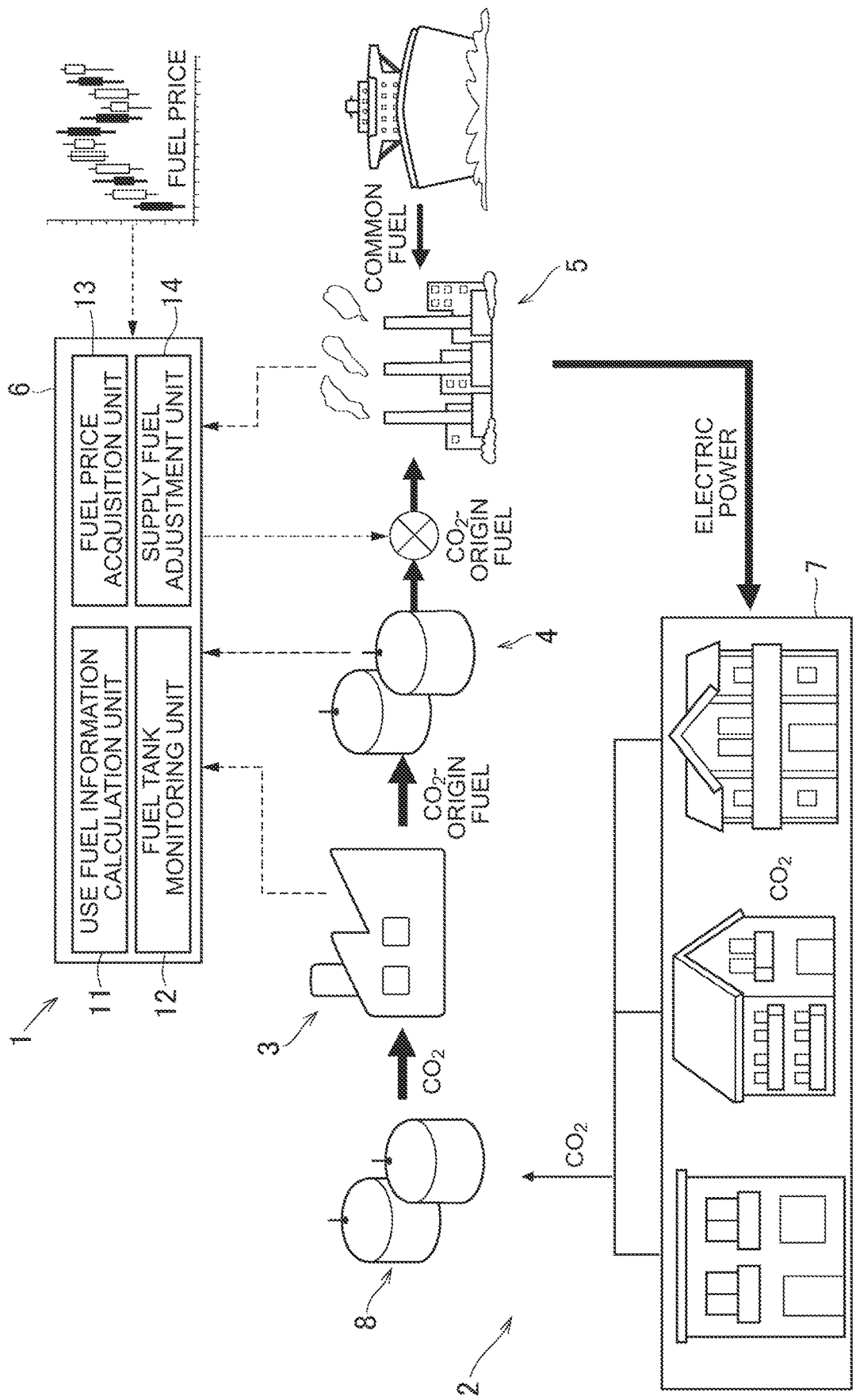
FIG. 1 is a diagram for illustrating the configuration of a fuel supply control apparatus according to an embodiment of the present disclosure and is a functional block diagram showing a distribution system of carbon dioxide ($CO_2$) that is recovered from exhaust gas or the atmosphere and recycled carbon dioxide-origin fuel ($CO_2$-origin fuel), a control system for supplying carbon dioxide-origin fuel ($CO_2$-origin fuel) in a fuel storage facility (fuel tank) to a power generation facility (power generating plant), and other systems.

An embodiment of the present disclosure will be described with reference to the accompanying drawings. The embodiment described below is only a specific example embodiment of the present disclosure and does not limit the applicable embodiment.

A fuel supply control apparatus according to the embodiment of the present disclosure supplies a power generation facility with fuel (carbon dioxide-origin fuel) that is recycled as a fuel from carbon dioxide that is emitted when energy is consumed. The carbon dioxide-origin fuel produced by recycling is stored in a predetermined fuel storage facility and is transported from the fuel storage facility to a power generation facility based on a supply time and a supply amount set by the fuel supply control apparatus.

FIG. 1 shows the fuel supply control apparatus according to the embodiment of the present disclosure, an example of a distribution system of carbon dioxide ($CO_2$) that is recovered from exhaust gas or the atmosphere and recycled carbon dioxide-origin fuel ($CO_2$-origin fuel), and other systems. The fuel supply control apparatus 1 shown in FIG. 1 uses carbon dioxide recovered by a carbon dioxide recovery system 2. Carbon dioxide recovered by the carbon dioxide recovery system 2 is recycled in a carbon dioxide recycling apparatus 3, and carbon dioxide-origin fuel is produced. The carbon dioxide-origin fuel produced in the carbon dioxide recycling apparatus 3 is once stored in a fuel storage facility (fuel tank) 4. The fuel supply control apparatus 1 supplies the carbon dioxide-origin fuel stored in the fuel storage facility 4 to a power generation facility (power generating plant) 5. Specifically, a control unit 6 that is a component of the fuel supply control apparatus 1 controls the supply time and supply amount of carbon dioxide-origin fuel to be supplied from the fuel storage facility 4 to the power generation facility 5. The control unit 6 is an example of an electronic control unit in the present disclosure.

The carbon dioxide recovery system 2 recovers carbon dioxide emitted when energy is consumed. The carbon dioxide recovery system 2 recovers or collects carbon dioxide that is emitted when fuel containing carbon is burned, such as carbon dioxide in exhaust gas from a vehicle equipped with an engine or carbon dioxide that is emitted from a space heater, a boiler, or the like. FIG. 1 shows an image in which the carbon dioxide recovery system 2 recovers carbon dioxide ($CO_2$) that is emitted in a so-called smart city 7 and stores the carbon dioxide ($CO_2$) in a predetermined storage facility ($CO_2$ tank 8).

The smart city 7 in this case is, for example, a city or a region defined as "a sustainable city or a region operated through management (plan, facility, control, operation) by using a new technology, such as information communication technology (ICT), over issues in the city to achieve total optimization" (the Ministry of Land, Infrastructure and Transport (Japan)) and has been developed for a demonstration experiment and actual use in recent years. Carbon dioxide recovered in the smart city 7 is, for example, transported through a pipe line (not shown) laid between the smart city 7 and the $CO_2$ tank 8. Alternatively, carbon dioxide recovered in the smart city 7 is transported to the $CO_2$ tank 8 by a transport vehicle or a transport device (not shown) autonomously driven between the smart city 7 and the $CO_2$ tank 8, a general transport vehicle (not shown), or the like.

Recovery of carbon dioxide in the carbon dioxide recovery system 2 is able to be performed by applying known various methods and techniques, for example, "physical adsorption", "physical absorption", "chemical absorption", "cryogenic separation", and the like, described in Japanese Unexamined Patent Application Publication No. 2021-008852 (JP 2021-008852 A). In "physical adsorption", for example, carbon dioxide is adsorbed to a solid adsorbent, such as activated carbon and zeolite, by bringing exhaust gas into contact with the solid adsorbent, and the solid adsorbent to which carbon dioxide is adsorbed is heated or decompressed. Thus, carbon dioxide is desorbed from the solid adsorbent to be recovered. In "physical absorption", for example, carbon dioxide is physically absorbed into an absorbing solution capable of dissolving carbon dioxide, such as methanol and ethanol, under high-pressure and low-temperature conditions by bringing exhaust gas into contact with the absorbing solution, and the absorbing solution in which carbon dioxide is absorbed is heated or decompressed. Thus, carbon dioxide is recovered from the absorbing solution. In "chemical absorption", for example, exhaust gas is brought into contact with an absorbing solution capable of selectively dissolving carbon dioxide, such as amine, carbon dioxide is absorbed into the absorbing solution by chemical reaction that takes place at that time, and the absorbing solution in which carbon dioxide is absorbed is heated. Thus, carbon dioxide is dissociated from the absorbing solution to be recovered. In "cryogenic separation", carbon dioxide is liquefied by compressing and cooling exhaust gas, and the liquefied $CO_2$ is selectively distilled. Thus, carbon dioxide is recovered.

The carbon dioxide recycling apparatus 3 produces so-called carbon dioxide-origin fuel by recycling carbon dioxide recovered by the carbon dioxide recovery system 2 as a fuel. Recycling of carbon dioxide in the carbon dioxide recycling apparatus 3, that is, production of carbon dioxide-origin fuel, is able to be performed by using the photosynthesis of algae as in the case of, for example, the "fuel production unit" described in JP 2012-244982 A. Other than that, carbon dioxide-origin fuel, such as a liquid synthetic fuel that is a synthesis of carbon dioxide and hydrogen, is able to be produced by applying various methods and techniques. Then, the carbon dioxide-origin fuel produced in the carbon dioxide recycling apparatus 3 is stored in the fuel storage facility (fuel tank) 4. The carbon dioxide recycling apparatus 3 is connected to the control unit 6 of the fuel supply control apparatus 1 so as to be able to perform data communication.

The fuel storage facility (fuel tank) 4 stores the carbon dioxide-origin fuel produced in the carbon dioxide recycling apparatus 3 as described above. The fuel storage facility 4 is connected to the control unit 6 of the fuel supply control apparatus 1 so as to be able to perform data communication.

The power generation facility (power generating plant) 5 is typically a thermal power plant and converts thermal energy generated by burning the carbon dioxide-origin fuel into electric energy. The power generation facility 5 is connected to the control unit 6 of the fuel supply control apparatus 1 so as to be able to perform data communication. The power generation facility 5 in the embodiment of the present disclosure may be intended for, for example, a generator or a power generation apparatus (not shown), such as a generator that is driven by an engine, which converts thermal energy generated by burning fuel into electric energy. The power generation facility 5 may be intended for, other than the thermal power plant as described above, for example, a power generating plant, such as a hydraulic power plant and a nuclear power plant, which includes a generator or a power generation apparatus for obtaining electric power to be used in the power generating plant.

The control unit 6 is an electronic control unit mainly made up of, for example, a server computer or a microcomputer, and makes up a major part of the fuel supply control apparatus 1 in the embodiment of the present disclosure. Therefore, the control unit 6 sets the supply time and supply amount of the carbon dioxide-origin fuel to be supplied from the fuel storage facility 4 to the power generation facility 5. Various data are input from the carbon dioxide recycling apparatus 3, the fuel storage facility 4, the power generation facility 5, and the like to the control unit 6. The control unit 6 is, for example, connected to an external server (not shown), a website on the Internet, or the like via a public communication line, a dedicated communication line, or the like. Therefore, for example, as will be described later, the control unit 6 is capable of occasionally acquiring information on the current price of a common fuel (a crude oil price, the purchase price of a common fuel, or the like) to be used in the power generation facility 5. The control unit 6 performs computation by using input various data and prestored data, calculation expressions, and the like. The control unit 6 is configured to output the computation result as a control command signal and, as described above, control supply of the carbon dioxide-origin fuel from the fuel storage facility 4 to the power generation facility 5. FIG. 1 shows an image in which one control unit 6 is provided. Alternatively, in the embodiment of the present disclosure, a plurality of the control units 6 may be provided in correspondence with, for example, control details or controlled objects. Alternatively, for example, an integration of computers (not shown) respectively provided in the carbon dioxide recycling apparatus 3, the fuel storage facility 4, and the power generation facility 5 with a main server (not shown) installed in a predetermined place or facility may be comprehensively regarded as the control unit 6.

Specifically, the control unit 6 in the embodiment of the present disclosure includes, for example, a use fuel information calculation unit 11, a fuel tank monitoring unit 12, a fuel price acquisition unit 13, and a supply fuel adjustment unit 14.

The use fuel information calculation unit 11 acquires fuel information on fuel to be used in the power generation facility 5 (use fuel). The power generation facility 5 in the embodiment of the present disclosure generates electric power by using the above-described carbon dioxide-origin fuel and an existing fuel (common fuel) different from the carbon dioxide-origin fuel, such as petroleum, coal, and natural gas. Therefore, in the embodiment of the present disclosure, the above-described common fuel and the carbon dioxide-origin fuel correspond to the use fuel in the power generation facility 5. The use fuel information calculation unit 11 acquires, for example, the usage amount (or required amount) of the use fuel in the power generation facility 5, the production time of the carbon dioxide-origin fuel, the production amount of the carbon dioxide-origin fuel, and the like as the fuel information in this case. Alternatively, the usage amount (or required amount) of the use fuel in the power generation facility 5, the production time of the carbon dioxide-origin fuel, and the production amount of the carbon dioxide-origin fuel are calculated from data related to the usage amount (or required amount) of the use fuel in the power generation facility 5, the production time of the carbon dioxide-origin fuel, and the production amount of the carbon dioxide-origin fuel.

The fuel tank monitoring unit 12 monitors the stored amount of the carbon dioxide-origin fuel in the fuel storage facility 4 at any time and acquires the stored amount of the carbon dioxide-origin fuel in the fuel storage facility 4. Alternatively, the stored amount of the carbon dioxide-origin fuel in the fuel storage facility 4 is calculated from data related to the stored amount of the carbon dioxide-origin fuel in the fuel storage facility 4.

The fuel price acquisition unit 13 acquires the current price of the common fuel (or the purchase price of the common fuel, or a crude oil price) of the use fuel to be used in the power generation facility 5. The fuel price acquisition unit 13 is capable of acquiring the current price of the common fuel or data related to the current price of the common fuel from, for example, an external server, a website on the Internet, or the like.

The supply fuel adjustment unit 14 adjusts and sets the supply time and supply amount of the carbon dioxide-origin fuel to be supplied to the power generation facility 5. When, for example, a pipe line (not shown) that transports the carbon dioxide-origin fuel is laid between the fuel storage facility 4 and the power generation facility 5, the supply fuel adjustment unit 14 adjusts the opening degree of a valve (not shown) that adjusts the flow rate of the carbon dioxide-origin fuel to be transported through the pipe line. Alternatively, when the carbon dioxide-origin fuel is transported by a transport vehicle or a transport device (not shown) that is operated between the fuel storage facility 4 and the power generation facility 5, the supply fuel adjustment unit 14 adjusts the transport amount of the carbon dioxide-origin fuel by the transport vehicle or the transport device.

As described above, the fuel supply control apparatus 1 according to the embodiment of the present disclosure is mainly intended to supply the carbon dioxide-origin fuel that is recycled from carbon dioxide in exhaust gas or in the atmosphere in appropriate supply time at appropriate supply amount. Therefore, the fuel supply control apparatus 1 according to the embodiment of the present disclosure is configured to execute control shown in the following flowchart of FIG. 2.

In the flowchart shown in FIG. 2, in step S1, the fuel information on the use fuel to be used in the power generation facility 5 is acquired. Specifically, for example, the current price of the common fuel (or the purchase price of the common fuel, or a crude oil price), the stored amount of the carbon dioxide-origin fuel in the fuel storage facility 4, the production time of the carbon dioxide-origin fuel, the production amount of the carbon dioxide-origin fuel, the usage amount (or required amount) of the use fuel in the power generation facility 5, and the like are acquired as the fuel information.

Subsequently, in step S2, it is determined whether the stored amount of the carbon dioxide-origin fuel (the remaining amount of $CO_2$-origin fuel) in the fuel storage facility 4 is less than or equal to a predetermined amount. The predetermined amount in this case is set in advance as a threshold for determining the remaining amount of storable capacity of the carbon dioxide-origin fuel in the fuel storage facility 4. When the stored amount of the carbon dioxide-origin fuel exceeds the predetermined amount, it is determined that the remaining storable capacity of the carbon dioxide-origin fuel is small and the fuel storage facility 4 is likely to be full (it is necessary to reduce the stored amount of the carbon dioxide-origin fuel). Once the fuel storage facility 4 becomes full, the carbon dioxide-origin fuel is not able to be produced thereafter. In other words, an opportunity to produce the carbon dioxide-origin fuel is missed.

Therefore, when the stored amount of the carbon dioxide-origin fuel in the fuel storage facility 4 is less than or equal to the predetermined amount and, therefore, the determination of step S2 is affirmative, that is, when it is determined that there is still room in the storable capacity of the carbon dioxide-origin fuel in the fuel storage facility 4, the process proceeds to step S3.

In step S3, it is determined whether the current price of the common fuel (common fuel price) is lower than or equal to a predetermined price. The predetermined price in this case is set in advance as a threshold for determining the cost performance resulting from using the carbon dioxide-origin fuel in the power generation facility 5. When the current price of the common fuel exceeds the predetermined price, it is determined that cost performance resulting from using the carbon dioxide-origin fuel in the power generation facility 5 is high and it is effective to actively use the carbon dioxide-origin fuel.

Therefore, when the current price of the common fuel is lower than or equal to the predetermined price and, therefore, the determination of step S3 is affirmative, that is, when it is determined that cost performance resulting from using the carbon dioxide-origin fuel in the power generation facility 5 is low, the process proceeds to step S4.

In step S4, the supply amount of the carbon dioxide-origin fuel ($CO_2$-origin fuel) to be supplied from the fuel storage facility 4 to the power generation facility 5 is set to an initial value. The initial value in this case is determined as the supply amount of the carbon dioxide-origin fuel by assuming when (at a time when) the current price of the common fuel is low and cost performance resulting from using the carbon dioxide-origin fuel in the power generation facility 5 is low and is set to a relatively small value. In other words, the initial value is set to a value less than the supply amount of the carbon dioxide-origin fuel that is set when (at a time when) the current price of the common fuel is high and cost performance resulting from using the carbon dioxide-origin fuel in the power generation facility 5 is high. Therefore, when the supply amount of the carbon dioxide-origin fuel is set to the initial value in step S4, the supply amount of the carbon dioxide-origin fuel is reduced when (at a time when) the current price of the common fuel is lower than or equal to the predetermined price as compared to when (at a time when) the current price of the common fuel is higher than the predetermined price. As a result, the ratio of the carbon dioxide-origin fuel to the use fuel in the power generation facility 5 decreases. The initial value in this case may be fluidly or variably set in synchronization with fluctuations in the current price of the common fuel. For example, the initial value may be set to a greater value as the current price of the common fuel increases. The initial value in this case may be fluidly or variably set in synchronization with fluctuations in the stored amount of the carbon dioxide-origin fuel. For example, the initial value may be set to a greater value as the stored amount of the carbon dioxide-origin fuel increases.

When the supply amount of the carbon dioxide-origin fuel to be supplied from the fuel storage facility 4 to the power generation facility 5 is set in step S4, the routine shown in the flowchart of FIG. 2 is ended thereafter.

On the other hand, when the stored amount of the carbon dioxide-origin fuel in the fuel storage facility 4 is greater than the predetermined amount and, therefore, the determination of step S2 is negative, that is, when it is determined that there is no room in the storable capacity of the carbon dioxide-origin fuel in the fuel storage facility 4 and the fuel storage facility 4 is likely to be full, the process proceeds to step S5.

In step S5, the supply amount of the carbon dioxide-origin fuel ($CO_2$-origin fuel) to be supplied from the fuel storage facility 4 to the power generation facility 5 is set to a value greater than the initial value. In other words, in this case, the fuel storage facility 4 is likely to be full of the carbon dioxide-origin fuel, and it is necessary to reduce the stored amount of the carbon dioxide-origin fuel. Therefore, the supply amount of the carbon dioxide-origin fuel to be supplied from the fuel storage facility 4 to the power generation facility 5 is increased as compared to normal times, and the stored amount of the carbon dioxide-origin fuel in the fuel storage facility 4 is quickly reduced. As a result, room is provided in the storable capacity of the carbon dioxide-origin fuel in the fuel storage facility 4 to avoid missing of an opportunity to produce the carbon dioxide-origin fuel due to the fact that the fuel storage facility 4 becomes full of the carbon dioxide-origin fuel.

Therefore, when the supply amount of the carbon dioxide-origin fuel is set to a value greater than the initial value in step S5, the supply amount of the carbon dioxide-origin fuel is increased when (at a time when) there is small room in the storable capacity of the carbon dioxide-origin fuel in the fuel storage facility 4 as compared to when (at a time when) there is room in the storable capacity of the carbon dioxide-origin fuel in the fuel storage facility 4. As a result, the ratio of the carbon dioxide-origin fuel to the use fuel in the power generation facility 5 increases, and there arises room in the storable capacity of the carbon dioxide-origin fuel in the fuel storage facility 4. The supply amount in this case may be fluidly or variably set in synchronization with fluctuations in the stored amount of the carbon dioxide-origin fuel in the fuel storage facility 4. For example, the supply amount in this case may be set to a greater value as the stored amount of the carbon dioxide-origin fuel in the fuel storage facility 4 increases.

When the supply amount of the carbon dioxide-origin fuel to be supplied from the fuel storage facility 4 to the power generation facility 5 is set in step S5, the routine shown in the flowchart of FIG. 2 is ended thereafter.

When the current price of the common fuel is higher than the predetermined price and, therefore, the determination of step S3 is negative, that is, when it is determined that cost performance resulting from using the carbon dioxide-origin fuel in the power generation facility 5 is high, the process proceeds to step S5 as in the case where the determination of step S2 is negative.

In step S5, the supply amount of the carbon dioxide-origin fuel ($CO_2$-origin fuel) to be supplied from the fuel storage facility 4 to the power generation facility 5 is set to a value greater than the initial value. In other words, in this case, it is at a time when the current price of the common fuel is high and cost performance resulting from using the carbon dioxide-origin fuel in the power generation facility 5 is high. Therefore, the supply amount of the carbon dioxide-origin fuel to be supplied from the fuel storage facility 4 to the power generation facility 5 is increased to increase cost performance resulting from using the carbon dioxide-origin fuel in the power generation facility 5. In other words, a fuel cost reduction effect obtained by using the carbon dioxide-origin fuel in the power generation facility 5 is improved.

Therefore, when the supply amount of the carbon dioxide-origin fuel is set to the value greater than the initial value in step S5, the supply amount of the carbon dioxide-origin fuel is increased when (at a time when) the current price of the common fuel is higher than the predetermined price as compared to when (at a time when) the current price of the common fuel is lower than or equal to the predetermined price. As a result, the ratio of the carbon dioxide-origin fuel to the use fuel in the power generation facility 5 increases. The supply amount to be set in this case may be fluidly or variably set in synchronization with fluctuations in the current price of the common fuel. For example, the supply amount to be set in this case may be set to a greater value as the current price of the common fuel increases.

When the supply amount of the carbon dioxide-origin fuel to be supplied from the fuel storage facility 4 to the power generation facility 5 is set in step S5, the routine shown in the flowchart of FIG. 2 is ended thereafter.

The stored amount of the carbon dioxide-origin fuel in the fuel storage facility 4, applied in step S2 and step S5, may be an estimated value predicted on the future stored amount of the carbon dioxide-origin fuel, for example, the stored amount of the carbon dioxide-origin fuel after a lapse of a predetermined period, based on the stored amount (remaining amount) of the carbon dioxide-origin fuel and the production time and production amount of the carbon dioxide-origin fuel in the carbon dioxide recycling apparatus 3, acquired as the fuel information. As a result, when, for example, the stored amount of the carbon dioxide-origin fuel in the fuel storage facility 4 is greater than a predetermined amount and it is predicted that the fuel storage facility 4 becomes full, the stored amount of the carbon dioxide-origin fuel stored in the fuel storage facility 4 is able to be reduced by increasing the supply amount of the carbon dioxide-origin fuel. In other words, it is possible to provide room in advance in the storable capacity of the fuel storage facility 4 in anticipation that the fuel storage facility 4 becomes full of the carbon dioxide-origin fuel. Therefore, it is possible to further reliably avoid missing of an opportunity to produce the carbon dioxide-origin fuel due to the fact that the fuel storage facility 4 becomes full, so the carbon dioxide-origin fuel is able to be continuously produced by recycling carbon dioxide.

As described above, in the fuel supply control apparatus 1 according to the embodiment of the present disclosure, at the time of supplying the carbon dioxide-origin fuel from the fuel storage facility 4 to the power generation facility 5, each of the supply time and supply amount of the carbon dioxide-origin fuel is variably adjusted and set in consideration of the fuel information on the use fuel (the common fuel and the carbon dioxide-origin fuel) in the power generation facility 5. For example, the supply time and supply amount of the carbon dioxide-origin fuel are variably and flexibly set in consideration of the current price of the common fuel, the stored amount of the carbon dioxide-origin fuel in the fuel storage facility 4, the production time and production amount of the carbon dioxide-origin fuel, and the like. Therefore, with the fuel supply control apparatus 1 according to the embodiment of the present disclosure, it is possible to supply the carbon dioxide-origin fuel that is recycled from exhaust gas or the atmosphere to the power generation facility 5 in appropriate supply amount at appropriate supply time.

What is claimed is:

1. A fuel supply control apparatus configured to supply carbon dioxide-origin fuel to a power generation facility configured to generate electric power by at least using the carbon dioxide-origin fuel and a common fuel different from the carbon dioxide-origin fuel, the carbon dioxide-origin fuel being recycled as a fuel from carbon dioxide that is emitted when energy is consumed and being stored in a fuel storage facility, the fuel supply control apparatus comprising an electronic control unit configured to:
    set a supply time and supply amount of the carbon dioxide-origin fuel to be supplied to the power generation facility;
    acquire fuel information on a use fuel including the common fuel and the carbon dioxide-origin fuel to be used in the power generation facility; and
    variably adjust and set each of the supply time and the supply amount based on the fuel information.

2. The fuel supply control apparatus according to claim 1, wherein the electronic control unit is configured to:
    acquire a current price of the common fuel as the fuel information; and
    variably adjust each of the supply time and the supply amount based on the current price.

3. The fuel supply control apparatus according to claim 2, wherein the electronic control unit is configured to, when the current price is higher than a predetermined price, increase the supply amount as compared to when the current price is lower than or equal to the predetermined price, to increase a ratio of the carbon dioxide-origin fuel to the use fuel.

4. The fuel supply control apparatus according to claim 1, wherein the electronic control unit is configured to:
    acquire a stored amount of the carbon dioxide-origin fuel in the fuel storage facility as the fuel information; and
    variably adjust each of the supply time and the supply amount based on the stored amount.

5. The fuel supply control apparatus according to claim 4, wherein the electronic control unit is configured to, when the stored amount is greater than a first predetermined amount, increase the supply amount as compared to when the stored amount is less than or equal to the first predetermined amount, to increase a ratio of the carbon dioxide-origin fuel to the use fuel.

6. The fuel supply control apparatus according to claim 4, wherein the electronic control unit is configured to:
    acquire a production time of the carbon dioxide-origin fuel and a production amount of the carbon dioxide-origin fuel as the fuel information;
    predict a future stored amount that is the stored amount in a future based on the stored amount, the production time, and the production amount, acquired as the fuel information; and
    when the future stored amount is greater than a second predetermined amount, increase the supply amount as compared to when the future stored amount is less than or equal to the second predetermined amount, to increase a ratio of the carbon dioxide-origin fuel to the use fuel.

\* \* \* \* \*